United States Patent
Szurdi et al.

(10) Patent No.: US 12,309,116 B2
(45) Date of Patent: May 20, 2025

(54) DETECTING SHADOWED DOMAINS

(71) Applicant: Palo Alto Networks, Inc., Santa Clara, CA (US)

(72) Inventors: Janos Szurdi, Santa Clara, CA (US); Rebekah Houser, Sunnyvale, CA (US); Daiping Liu, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 287 days.

(21) Appl. No.: 17/878,665

(22) Filed: Aug. 1, 2022

(65) Prior Publication Data

US 2024/0039890 A1 Feb. 1, 2024

(51) Int. Cl.
*H04L 9/40* (2022.01)
*H04L 41/16* (2022.01)

(52) U.S. Cl.
CPC .......... *H04L 63/0236* (2013.01); *H04L 41/16* (2013.01); *H04L 63/0263* (2013.01)

(58) Field of Classification Search
CPC .. H04L 63/0236; H04L 41/16; H04L 63/0263
See application file for complete search history.

(56) References Cited

U.S. PATENT DOCUMENTS

| | | | | |
|---|---|---|---|---|
| 9,300,623 | B1 * | 3/2016 | Earl | H04L 61/58 |
| 10,027,688 | B2 * | 7/2018 | Perdisci | H04L 63/1416 |
| 10,264,017 | B2 * | 4/2019 | Stemm | H04L 63/1483 |
| 2016/0226819 | A1 * | 8/2016 | Manadhata | H04L 61/4511 |
| 2016/0269362 | A1 * | 9/2016 | Rolette | H04L 63/20 |
| 2022/0337624 | A1 * | 10/2022 | Young | H04L 63/1483 |
| 2022/0394060 | A1 * | 12/2022 | Berger | G06F 8/38 |

OTHER PUBLICATIONS

Author Unknown, Domain Shadowing: When Good Domains Go Bad, RiskIQ.com, Jun. 22, 2016, https://www.riskiq.com/blog/external-threat-management/domain-shadowing-good-domains-go-bad/.

Florian Weimer, Passive DNS Replication, Apr. 2005, https://www.enyo.de/fw/software/dnslogger/first2005-paper.pdf.

Hamilton et al., Abstract of An Efficient Multi-Stage Approach for Identifying Domain Shadowing, ICC 2020-2020 EEE International Conference on Communications (ICC), Jun. 2020.

Hamilton et al., Abstract of Cluster Analysis of Passive DNS Features for Identifying Domain Shadowing Infrastructure, 2020 International Symposium on Networks, Computers and Communications (ISNCC), Oct. 2020.

Hamilton et al., An Efficient Multi-Stage Approach for Identifying Domain Shadowing, ICC 2020-2020 IEEE International Conference on Communications (ICC), Jun. 2020.

(Continued)

*Primary Examiner* — Ali S Abyaneh
(74) *Attorney, Agent, or Firm* — Van Pelt, Yi & James LLP

(57) ABSTRACT

A method and system for detecting shadowed domains is provided. New hostnames are collected for a predetermined period of time. Candidate shadowed domains are selected from the new hostnames. Classification of the candidate shadowed domains is performed based on a plurality of features relating to the candidate shadowed domains to output a set of identified shadowed domains. An action is performed based on the set of identified shadowed domains.

16 Claims, 11 Drawing Sheets

(56) References Cited

OTHER PUBLICATIONS

Hamilton et al., Cluster Analysis of Passive DNS Features for Identifying Domain Shadowing Infrastructure, 2020 International Symposium on Networks, Computers and Communications (ISNCC), Oct. 2020.

Liu et al., Don't Let One Rotten Apple Spoil the Whole Barrel: Towards Automated Detection of Shadowed Domains, CCS' 17, 2017.

P. Mockapetris, 3.6 Resource Record, Nov. 1987, pp. 11-15, https://www.rfc-editor.org/rfc/rfc1034#section-3.6.

* cited by examiner

| FQDN | IP Address | CC | First Seen | Last Seen |
|---|---|---|---|---|
| vantagetennis.co.uk | 94.136.40.103 | GB | 12/26/2013 | 1/30/2021 |
| www.vantagetennis.co.uk | 94.136.40.103 | GB | 12/26/2013 | 1/21/2021 |
| benign-example1.vantagetennis.co.uk | 94.136.40.102 | GB | 12/12/2014 | 12/12/2019 |
| spjcww.angell.vantagetennis.co.uk | 178.32.131.185 | FR | 6/11/2015 | 5/17/2017 |
| tey9s9.angell.vantagetennis.co.uk | 178.32.131.185 | FR | 6/5/2015 | 6/5/2015 |
| to5rsd.angell.vantagetennis.co.uk | 178.32.131.185 | FR | 6/10/2015 | 5/18/2017 |
| n5pb9t.angell.vantagetennis.co.uk | 178.32.131.185 | FR | 4/7/2016 | 4/16/2016 |
| 5c6kut.angell.vantagetennis.co.uk | 178.32.131.185 | FR | 6/11/2015 | 3/30/2016 |
| index.hu | 81.0.120.157 | HU | 2/28/2019 | 5/2/2022 |
| www.index.hu | 217.20.130.99 | HU | 12/19/2013 | 5/2/2022 |
| benign-example2.index.hu | 217.20.130.98 | HU | 8/16/2018 | 5/2/2022 |
| dyndns.com | 162.88.175.1 | US | 6/12/2017 | 4/7/2022 |
| dakdkadik321.dyndns.com | 104.102.27.112 | BE | 6/26/2021 | 7/28/2021 |

FIG. 2

DETECTING SHADOWED DOMAINS

BACKGROUND OF THE INVENTION

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide http://en.wikipedia.org/wiki/Firewall_(computing) firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 2 is an example of a list of shadowed domains and benign domains.

DETAILED DESCRIPTION

Figure 1:
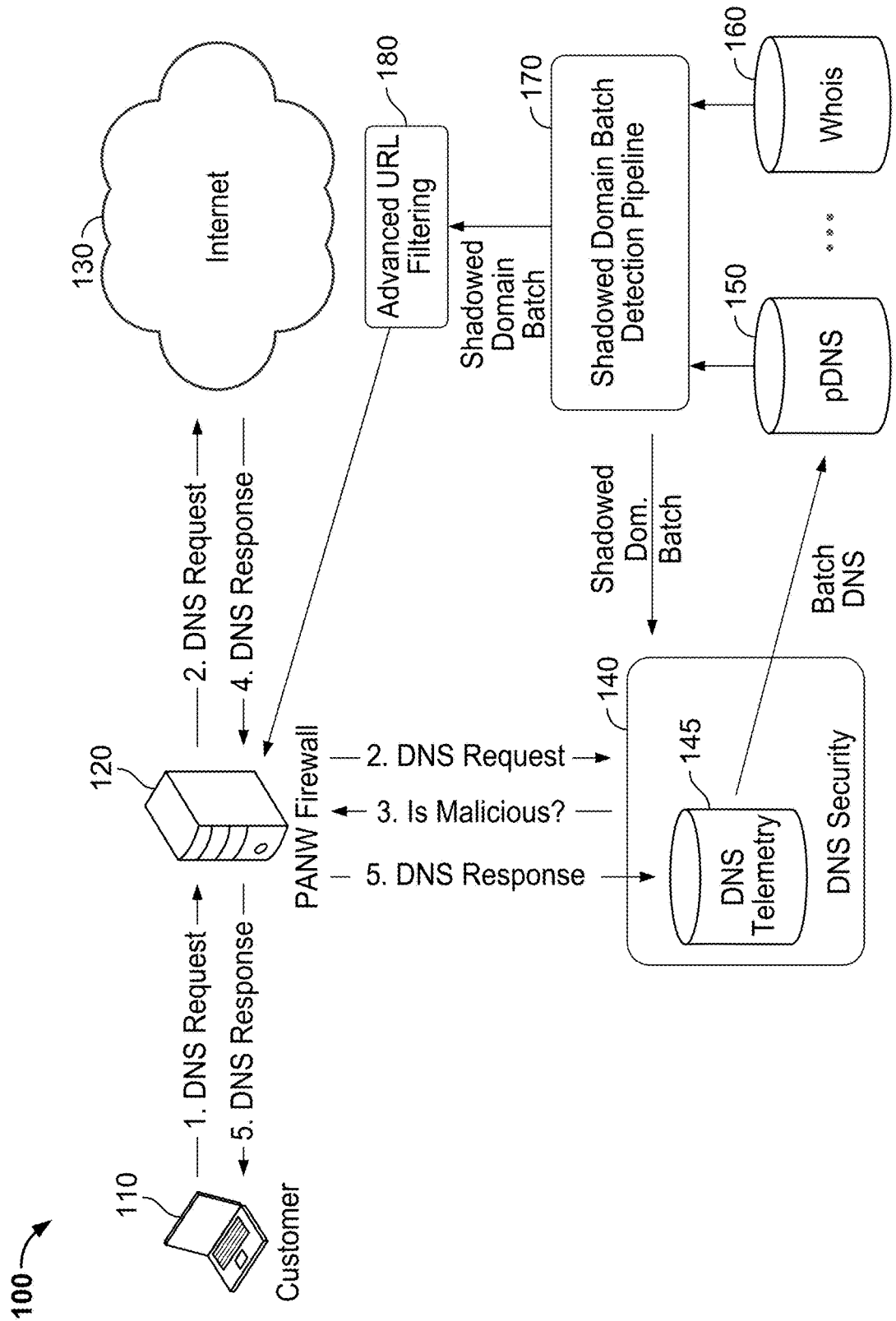
FIG. 1 is a functional block diagram illustrating an architecture for detecting shadowed domains in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Malicious software (malware) generally refers to unwanted, hostile, or intrusive software that can be used to disrupt computer or network operations, collect private or sensitive information, or access private computer systems or networks. Malware can be in the form of executable code, scripts, active content, and other software. Example malware includes computer viruses, worms, Trojan horses, rootkits, keyloggers, spyware, adware, botnet command and control (C&C) related malware, and other unwanted, hostile, or intrusive software.

Security solutions (e.g., security devices or appliances, which can provide firewall solutions) can be used to safeguard against malware. For example, a firewall can identify and prevent the further spread of malware in a network.

A firewall generally protects networks from unauthorized access while permitting authorized communications to pass through the firewall. A firewall is typically implemented as a device or a set of devices, or software executed on a device, such as a computer or appliance, that provides a firewall function for network access. For example, firewalls can be integrated into operating systems of devices (e.g., computers, smart phones, tablets, or other types of network communication capable devices). Firewalls can also be integrated into or executed as software on servers, gateways, network/routing devices (e.g., network routers), or appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A network domain generally refers to a domain that is identified by a domain name. A domain name typically includes an identification string (e.g., www.example-website.com) that defines a realm of authority or control for a domain on the Internet. Domain names are generally formed by rules and procedures of the Domain Name System (DNS). A domain name can be registered in the DNS as a domain name.

Network domains can be used in various networking contexts and application-specific naming and addressing purposes. For example, a domain name can be used to identify an Internet Protocol (IP) resource, such as a web site (e.g., a server hosting a web site), or any other service accessible via the Internet (e.g., a File Transfer Protocol (FTP) resource or other services accessible via the Internet).

A DNS service can be used to translate a domain name into an IP address. For example, when a user types in a domain name (e.g., an Internet or Intranet domain name), such as example.com, using a web browser, an authoritative DNS server can translate the domain name into an IP address, such as 172.16.254.1 (for IPv4) and 2001:db8:0:1234:0:567:8:1 (for IPv6). However, if a user attempts to perform a DNS lookup or host command on an unregistered or invalid domain name, such as examplefakedomain.com, then an error can be received indicating that such is a non-existing domain name, or in other words, that such is a non-existent domain (NXDOMAIN). Generally, an NXDOMAIN (e.g., an NXDOMAIN response received in response to a DNS query for a given domain name) is a condition or error that can be indicated for an Internet domain name that is unable to be resolved using the DNS servers (e.g., invalid domain name) or that the Internet domain name is not yet registered. In some cases, an NXDOMAIN can also be indicated due to a network or DNS server problem.

Network domains can also be used by malware. For example, malware can be distributed or propagated using a network domain, such as www.bad-malware-download-site.com. As another example, botnet C&C related malware can be associated with a network domain, such as www.botnet-site.com. Various commercial efforts as well as open project efforts exist to provide listings of network domains (e.g., bad/malware domains) that are known to be used to distribute or propagate malware. Some approaches use such network domain listings (e.g., bad/malware domain listings) to provide spoofed replies, in response to any requests to a network domain on such a listing, as a mechanism for preventing propagation of malware distribution.

Blackholing is a technique that can be used to send all traffic (e.g., network communications) to a network domain (e.g., DNS or IP address) to a null interface or non-existent server (e.g., sometimes referred to as a black hole). For example, an Internet Service Provider (ISP) can manage such blackholing for efficiency and to avoid affecting network connectivity. However, while blackholing may be efficient for certain types of severe network attacks, such an approach fails to allow for analysis of the traffic to the blackholed network domain.

Sinkholing generally refers to a technique for routing traffic (e.g., network communications) to a valid IP address. For example, a security device (e.g., a network device, which can be implemented using a server or appliance) associated with the valid IP address can receive the traffic that was directed (e.g., redirected) to the sinkholed IP address that is associated with the network domain. The security device that receives the traffic can analyze the traffic. Based on the analysis of the traffic, the security device can then perform an action (e.g., reject bad packets or perform some other action).

For example, malware, such as C&C malware and/or other types of malware, can use domain names for various nefarious purposes including communication with command and control servers and phishing. To perpetrate these activities, cybercriminals can either purchase domain names (malicious registration) or compromise existing ones (DNS hijacking/compromise).

Domain shadowing is a subcategory of DNS hijacking where cybercriminals attempt to stay unnoticed after hijacking a domain name. First, cybercriminals stealthily insert subdomains—called shadowed domains—under a compromised domain name. Second, the cybercriminals keep existing records to allow normal operation of services such as websites, email servers, and any other services that were using a compromised domain. By ensuring the undisturbed operation of existing services, the cybercriminals can make the compromised domain inconspicuous to domain owners and a cleanup of malicious entries unlikely. As a result, domain shadowing provides cybercriminals access to virtually unlimited subdomains inheriting the compromised domain's benign reputation.

What is needed are new and improved techniques for detecting shadowed domains.

Accordingly, techniques for shadowed domain detection are provided.

In some embodiments, a system/method/computer program product for detecting shadowed domains includes collecting new hostnames for a predetermined period of time; selecting candidate shadowed domains from the new hostnames; performing classification of the candidate shadowed domains based on a plurality of features relating to the candidate shadowed domains to output a set of identified shadowed domains; and performing an action based on the set of identified shadowed domains.

In some embodiments, the collecting of the new hostnames for the predetermined period of time includes determining whether a newly observed hostname (NOH) from a new hostnames dataset is found in an allowlist; and in the event that the NOH is found in the allowlist, determining that the NOH is not shadowed.

In some embodiments, the performing of the classification of the candidate shadowed domains includes extracting the plurality of features relating to the candidate shadowed domains; and performing the classification of the candidate shadowed domains using a model or a set of rules.

In some embodiments, the model is a machine learning model.

In some embodiments, the model is a machine learning model, the machine learning model being a neural network.

In some embodiments, the system/method/computer program product further includes before the performing of the action, performing the post-processing on the set of identified shadowed domains, including: comparing a subnetwork of an IP address of an identified shadowed domain with a subnetwork of an IP address of a root domain associated with the identified shadowed domain; and in response to a determination that the subnetwork of an IP address of the identified shadowed domain matches the subnetwork of an IP address of the root domain associated with the identified shadowed domain, determining that the identified shadowed domain is likely benign.

In some embodiments, the subnetwork corresponds to the first 24 bits of the IP address of the identified shadowed domain.

In some embodiments, the comparing of the subnetwork of an IP address of the identified shadowed domain with the subnetwork of an IP address of the root domain associated with the identified shadowed domain includes comparing the subnetwork of an IP address of the identified shadowed domain with the subnetwork of an IP address of the root domain associated with the identified shadowed domain based on an active DNS dataset and a passive DNS dataset.

In some embodiments, the system/method/computer program product further includes before the performing of the action, performing post-processing on the set of identified shadowed domains, including: comparing a time since creation of an identified shadowed domain with a predefined threshold; and in response to a determination that the time since creation of the identified shadowed domain is equal to or exceeds the predefined threshold, determining that the identified shadowed domain is not shadowed.

In some embodiments, the system/method/computer program product further includes before the performing of the action, performing post-processing on the set of identified shadowed domains, including: comparing a time since the root domain of an identified shadowed domain was registered with a predefined threshold; and in response to a determination that the time since the root domain of the identified shadowed domain was registered is less than or equal to the predefined threshold, determining that the identified shadowed domain is not shadowed.

FIG. 1 is a functional block diagram illustrating an architecture for detecting shadowed domains in accordance with some embodiments. In some embodiments, the architecture 100 includes a customer 110, a Firewall 120, The Internet 130, a DNS Security Module 140 including a DNS Telemetry Module 145, a passive DNS (pDNS) Module 150, a Whois Module 160, a Shadowed Domain Batch Detection Pipeline 170, and an Advanced URL Filtering Module 180.

In operation 1, the customer 110 sends a DNS request to the Firewall 120.

In operation 2, the Firewall 120 forwards the DNS request to the Internet 130 so that the DNS request can be resolved, and also forwards the DNS request to the DNS Security Module 140.

In some embodiments, the DNS Security Module 140 forwards batch DNS data to the pDNS Module 150 et al. The pDNS Module 150, the Whois Module 160, et al. can send the data to the Shadowed Domain Batch Detection Pipeline 170 which provides shadowed domain batch information to the DNS Security Module 140 and the Advanced URL Filtering Module 180.

In some embodiments, the Advanced URL Filtering Module 180 sends its output to the Firewall 120.

In operation 3, the DNS Security Module 140 sends its output (malicious or benign) to the Firewall 120.

In operation 4, the Firewall 120 receives a DNS response from the Internet 130.

In operation 5, based on the DNS response and the outputs of the DNS Security Module 140 and the Advanced URL Filtering Module 180, the Firewall 120 sends a DNS response to the customer 110 and the DNS Security Module 140. In some embodiments, the DNS Telemetry Module 145 collects DNS responses, stores the DNS responses, and forwards the DNS responses to various pDNS related modules such as, for example, a New Hostnames module, a pDNS module, a Unique RR module, etc.

After the outputs of the DNS Security Module 140 and the Advanced URL Filtering Module 180, the Firewall 120 can block shadowed domains.

FIG. 2 is an example of a list of shadowed domains and benign domains.

In the list 200, domains spjcww.angell.vantagetennis-.co.uk, tey9s9.angell.vantagetennis.co.uk, to5rsd.angell.vantagetennis.co.uk, n5pb9t.angell.vantagetennis.co.uk, and 5c6kut.angell.vantagetennis.co.uk are malicious domains. The IP address of these malicious domains have the same IP country code (CC) and were created around the same time. The other domains in the list 200 represent benign domains.

As an example, the root domain vantagetennis.co.uk was registered in 2013 and a few benign subdomains were created under the root domain vantagetennis.co.uk (e.g., www.vantagetennis.co.uk and benign-example1.vantagetennis.co.uk). IP addresses of the benign domains are all located in the same /24 subnet. As an aspect, malicious subdomains (spjcww.angell.vantagetennis.co.uk, tey9s9.angell.vantagetennis.co.uk, to5rsd.angell.vantagetennis.co.uk, n5pb9t.angell.vantagetennis.co.uk, and 5c6kut.angell.vantagetennis.co.uk) follow a homogeneous naming pattern and use IP addresses located in a different country (FR) from the country (GB) of the IP address of the root domain. In addition, the malicious subdomains were created around the same time.

Figure 3:
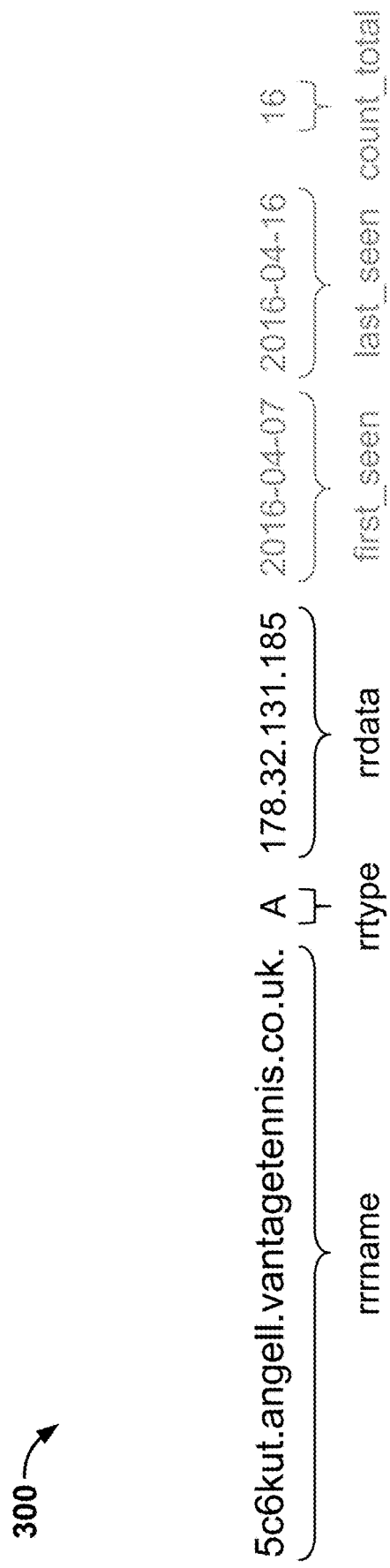
FIG. 3 is an example of a unique resource record (RR) entry.

FIG. 3 is an example of a unique resource record (RR) entry. The unique RR entry 300 is an entry of a passive DNS (pDNS) dataset. Entries within the pDNS dataset are collected from external sources (e.g. a third-party provider of pDNS data) and internal sources (e.g. network security devices), and deduplicated so that the pDNS dataset includes one entry per RR. Passive DNS replication typically ignores the class and time to live (TTL) of an RR, so a unique entry in this dataset is defined by rrname (owner), rrtype (type), and rrdata (data) of the RR (corresponding to rrname, rrtype and rrdata fields in the pDNS entry). Over 90 RR types exist. Some of the commonly used RR types are A, AAAA, CNAME, NS and MX. The data of an A resource record relates to the IP address. The Unique RR entry can also include metadata such as first time seen and last time seen by a source, and the number of times an RR was intercepted by a single source (e.g. a firewall, DNS resolver or other equipment configured to collect pDNS data) or by all sources combined (total count).

Figure 4:
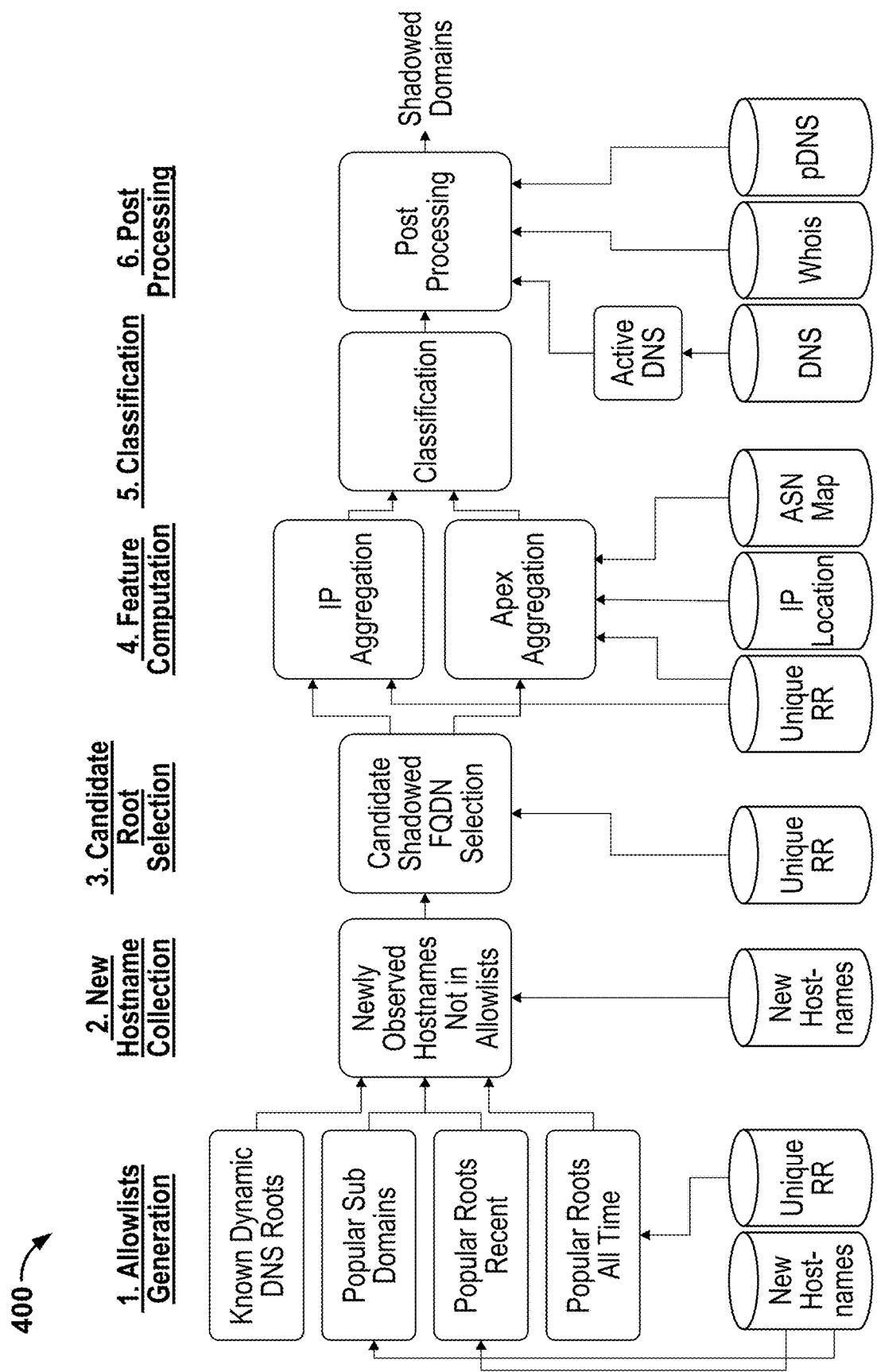
FIG. 4 is an example of a workflow for detecting shadowed domains.

FIG. 4 is an example of a workflow for detecting shadowed domains. In some embodiments, the workflow 400 is implemented by the shadowed domain detection pipeline 170 of FIG. 1 and includes six stages.

In the first stage, the detection pipeline generates an allowlist (or more than one allowlist) that includes domains unlikely to be shadowed and also includes domains where it would be costly to calculate their features because they typically have a large number of subdomains.

During the first stage, the allowlist aids the detection pipeline in removing domains from the analysis that are likely benign and/or for which calculating features would be computationally expensive. Four examples of allowlists are provided.

In a first allowlist example, the detection pipeline collects popular root domains from historical records in the unique RR dataset, where popular relates to having a large number of subdomains (e.g., 100,000, or more subdomains) under them. By filtering a small fraction of the popular root domains, in some cases, a majority of subdomains observed do not need to be processed. These popular root domains are less likely to be shadowed because their owner's operational security is typically better than an owner's operational security of less popular root domains.

In a second allowlist example, some popular root domains have a large number of subdomains added to them in a recent time frame (e.g., one week). Filtering a few of these root domains having a large number of recently added subdomains can result in a large reduction in the number of subdomains that the detection pipeline is to process. These recently popular root domains can be collected from the new hostnames dataset. In some embodiments, the new hostnames dataset is derived from pDNS data sources. In some embodiments, when the sources for the pDNS dataset report an RR with a rrname (hostname) that does not appear in the pDNS data sources already, information about that rrname is added to the new hostnames dataset.

In a third allowlist example, complementing the first and second allowlist examples, the detection pipeline can also filter known dynamic DNS root domains where users can create subdomain names at will. These dynamic DNS root domains cannot be shadowed by definition.

In a fourth allowlist example, the detection pipeline looks for popular subdomains where a popular subdomain indicates that many root domains have the same subdomain created under them. For example, popular subdomains include www, smtp, ns1, and ns2. By filtering out these popular subdomains, the detection pipeline can reduce the potential for false positives later on. In some embodiments, popular subdomains are collected over a longer period of time (e.g., weeks) from the new hostnames dataset.

As an example, the allowlisting helps filter the fully qualified domain name (FQDN) dakdkadlk32l.dyndns.com of FIG. 2 because the domain is a dynamic DNS provider. In another example, the allowlisting helps filter popular subdomains such as, for example, www.index.hu and www-.vantagetennis.co.uk.

In a second stage, the detection pipeline collects newly observed hostnames (NOHs) that are not in the allowlists from the new hostnames dataset. In some embodiments, the detection pipeline selects newest entries in a predetermined period of time (e.g., one day) from the new hostnames dataset. In some embodiments, the detection pipeline selects domain names that are not present in any of the allowlists.

In some embodiments, the detection pipeline retains only those new hostnames that are likely to be shadowed. A new hostname can be a candidate shadowed domain if the new hostname does not have any IP address in the same /24 subnets as its root domain's IP addresses. In addition, the detection pipeline filters domain names that only resolve to non-routable IP addresses, for example, private IP addresses (e.g. 10.X.X.X, 192.168.X.X) or erroneous IP addresses (e.g., 2.4.8.256). As an example, a candidate selection benign-example1.vantagetennis.co.uk would not be retained because the candidate has an IP address in the same /24 subnet as the root domain vantagetennis.co.uk.

In a third stage, the detection pipeline selects candidate shadowed domains from the NOHs using a unique RR dataset. As an example, a candidate shadowed domain does not have an IP address in the same subnet as its root domain's IP address(es).

In a fourth stage, the detection pipeline extracts features relating to the candidate shadowed domains.

For all candidate shadowed domains found in the third stage, the detection pipeline collects and calculates features to be used as inputs for a machine learning model. The features can be divided into three groups of features. The first group of features can relate to the candidate shadowed domain itself. The second group of features can describe a root domain of the candidate shadowed domain. The third group of features can correspond to IP addresses of the candidate shadowed domain. The three groups can be called, respectively: FQDN-level features, apex aggregation features, and IP aggregation features.

In some embodiments, the features are normalized to work with different types of machine learning algorithms that can be used. In some embodiments, log values of some features—that can have very large values—are used to scale the values before normalization. In some embodiments, for the calculation of some of the features, sampling is performed to decrease the cost of computation. As an example, some IP addresses are used by tens or hundreds of millions of domain names. To approximate IP aggregate features for these IP addresses, a subset of the FQDNs (e.g., 10,000) are randomly sampled.

As an example, feature values for spjcww.angell.vantagetennis.co.uk before normalization are obtained.

1. FQDN-Level Features

Is popular subdomain: is the domain a popular subdomain? If the domain is a popular subdomain, then the value is one, otherwise, the value is zero. Note: not all popular subs are filtered. For example, the hundred most popular subdomains can be filtered using a set of allowlists and the two hundred most popular subdomains can be considered as popular for this feature. This example is not a popular subdomain so the feature is zero.

IP/CC/ASN count: the number of IP addresses the candidate domain resolves to and the number of ASNs/CCs these IPs reside in. The example has one IP address so all three counts are ones.

IP/CC/ASN deviation: how different are IP addresses of the FQDN as compared to the root domain. In the case of IP address deviation, the longest common prefix between the root's common prefix and a prefix of a candidate's IP address (in binary) is used and the longest common prefix is subtracted from 32 to obtain the maximum possible value. CC and ASN deviations are zero if two IP addresses are in the same ASN/CC, one if the CC and ASN deviations are in different ASNs/CCs. For all three deviation features, the minimum deviations are calculated among all possible pairings between the candidate's and the root domain's IP addresses. The example has a vastly different IP address compared to the root domain's IP address, therefore, this feature will be 32. The ASN and CC deviation both will be one. However the IP deviation will be one between 94.136.40.103 and 94.136.40.102 as they are nearly the same.

94.136.40.103:
 01011110.10001000.00101000.01100111
178.32.131.185:
 10110010.00100000.10000011.10111001
94.136.40.102:
 01011110.10001000.00101000.01100110

Number of days between the first day the candidate domain was seen and the first time the root was seen in pDNS. For this example, the number of days is 532.

Number of words in the subdomain and FQDN. These features are zero and three respectively.

Entropy of a subdomain and average entropy of strings in FQDN. In this example, the entropy of the subdomain is high because it is randomly generated but, for the entire FQDN, the entropy is not very high because it includes many words.

Prefix length. 12 is the prefix length for this example.

Prefix level count. The prefix level count is two in this example.

Is Apex wildcarding. This feature is an example indicating that the root domain is wildcarding.

Statistics: Example "statistics:" the minimum, the maximum, the average, the median, a unique count and/or Jeffrey divergence can be calculated.

2. Apex Aggregated Features

Number of subdomains: the number of subdomains created under the root domain. Seven in this example.

Number of popular subdomains. One in this example.

Ratio of popular subdomains to all subdomains. One over seven in this example.

Average IP address count. One in this example, as all subdomains have only one IP address.

Average total traffic. 98 in this example.

Minimum/Average number of days between the first day a subdomain was seen and the first time a root domain was seen in pDNS. Around 2 years in days.

CC deviation count and ratio of total CC deviation domains to subdomain count. In the example, there are two benign and five shadowed domains. The deviation count is five and the ratio is five over seven.

ASN deviation count and ratio of total ASN deviation to subdomain count. In this example, ASN deviation count and ratio correspond with the CC deviation count and ratio.

IP deviation statistics. The two benign domains have an IP deviation around zero while the malicious domains have an IP deviation of 32. The statistics will be calculated for the vector [0,1,32,32,32,32,32].

Prefix length statistics. In the example, statistics will be calculated for [3,15,12,12,12,12,12].

Prefix level count statistics. In the example, the prefix level count statistics is: [1,1,2,2,2,2,2]

Sub domain entropy statistics. In the example, a vector of two small numbers and five large numbers is to be used.

IP count statistics. In this example, it will be all ones.

Total DNS resolutions count statistics. The number of times requests to the domains were observed.

Total active day statistics. Active days is the number of days between the first seen day and last seen day.

Resolution count per active days statistics.

Resolution count per IP count statistics.

IP count per active day statistics.

First and last seen unique count and Jeffrey divergence.

IP aggregated feature examples are to be for IP Address 178.32.131.185. Please note that the feature examples are simplified, and in the real world, domains are often mapped to multiple IP addresses and vice-versa.

3. IP Aggregated Features

FQDN count. In this example, the FQDN count is five.

Apex count. In this example, the apex count is one.

Apex count per FQDN count. One over five is the Apex count per FQDN count in the example.

Number of popular subdomains. Zero popular subdomains in the example.

Ratio of popular subdomains to all subdomains. Zero in the example.

FQDN under wildcarding roots count. Five in the example.

FQDN under wildcarding roots ratio. One in the example (5/5).

Wildcarding root count. One wildcarding root in the example.

Wildcarding root ratio. One wildcarding root ratio in the example.

Average IP count. One in the example.

Average total resolution count. Because most domains in the example have a resolution count below a hundred, thus this feature would also be less than one hundred.

Total DNS resolution count statistics: As a domain can have multiple IP addresses, we can sum or average the number of resolutions.

IP count statistics. Example: the IP count statistics are [1,1,1,1,1].

CC deviation count and ratio: five and one (5/5) in the example.

ASN deviation count and ratio: five and one (5/5) in the example.

IP deviation statistics: Example [32,32,32,32,32].

Prefix length statistics. Example [12,12,12,12,12].

Prefix level count statistics. Example [2,2,2,2,2].

IP count statistics. Example [1,1,1,1,1].

Total active day statistics.

Resolution count per active days statistics.

Resolution count per IP count statistics.

IP count per active day statistics.

First and last seen unique count and Jeffrey divergence.

Since there can be multiple IP addresses for each candidate shadowed domain, the minimum, the average, and the maximum of each IP aggregate feature listed above are calculated over all the IP addresses a candidate domain is mapped to. Altogether more than three hundred features can be calculated.

For spjcww.angell.vantagetennis.co.uk, the following features can be indicative of domain shadowing:

IP deviation is high.

ASN and CC deviation is one.

Days to root feature is high.

Most FQDNs in Apex and IP aggregation have a high value for the previously mentioned four features so the corresponding aggregate features will be high too.

Ratio of popular subdomains is low.

Root is wildcarding.

Distribution of IP count, prefix levels, and other statistics are concentrated on a few values.

In a fifth stage, the detection pipeline classifies the candidate shadowed domains as shadowed domains or not using the extracted features. In some embodiments, a trained machine learning model is used to perform the classification.

In a sixth stage, before returning a malicious or benign verdict for each candidate shadowed domain, the detection pipeline post-processes the candidate shadowed domains to obtain identified shadowed domains to reduce the likelihood of false positives.

Because the classifier in the fifth stage does not have perfect accuracy and data provided during production can have a significantly different distribution compared to labeled training data, post-processing is to be performed before a verdict is returned.

To post-process domains classified as shadowed, active DNS, Whois, and pDNS records can be collected. In some embodiments, active DNS is used to complement data missing from pDNS. For example, if an IP address of a root domain is not seen in pDNS (the IP address of the root domain is the same as an IP address of a candidate shadowed domain), then a domain can be falsely classified as shadowed. Using active DNS, the false classification can be corrected.

In some embodiments, Whois records are checked to determine registration dates of domain names because candidate domain names under root domains registered recently are more likely to be malicious rather than to be shadowed.

In some embodiments, pDNS data is used to complement Whois records in the event that the registration dates of the domain names are not available. Additionally, a subdomain or its root domain is checked to determine whether the subdomain or its root domain is very popular in terms of DNS traffic, because a false positive is more likely for these popular domain names.

As an example, the post-processing of stage six would remove benign-example2.index.hu because active DNS can find a record that is in the same /24 as a root domain and then the domain name benign-example2.index.hu would be filtered.

In some embodiments, the workflow 400 is implemented in a big data setting to allow scalable processing of billions of records and terabytes of data. For example, the workflow 400 is implemented using Google's Big Query combined with processing on virtual machines in the cloud.

Figure 5A:
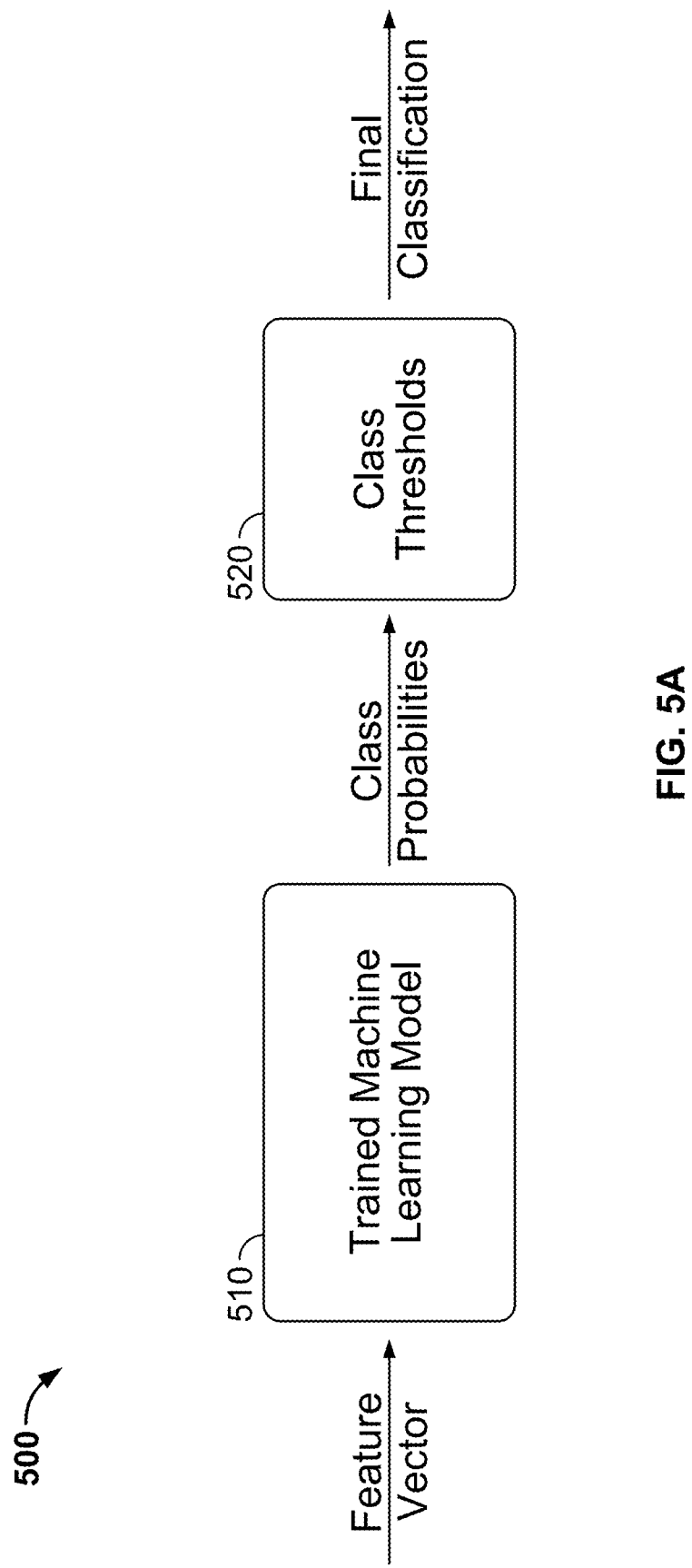
FIG. 5A is an example of a workflow for performing trained machine learning shadowed domain classification.

FIG. 5A is an example of a workflow for performing trained machine learning shadowed domain classification. In some embodiments, the workflow 500 is a high-level overview of a machine learning classification pipeline used to perform a classification, as in stage 5 of FIG. 4. In some embodiments, the machine learning classification pipeline includes a trained machine learning model 510 and a class thresholds module 520.

In some embodiments, feature selection is performed to forward only the most useful features that are input into the trained machine learning model 510 via a feature vector to increase its performance.

In some embodiments, a Chi-squared test is used for selecting features individually for the machine learning model 510. As many of the features are highly correlated with each other, a mutual correlation (e.g., Pearson) is calculated between all features. Initially all features are considered as candidate features. Using the Chi-squared test, the best feature is selected and the rating of the other features, based on how correlated they are with the selected best feature, is decreased. The best feature is added to a list of selected features and removed from the candidate feature list. Features are iteratively selected from the candidate list until the desired number of features is obtained. The more correlated a feature is to a previously selected feature, the less useful the feature would be to select as an additional feature to use.

In some embodiments, a Principal Component Analysis (PCA) technique is used to reduce the number of features. The PCA technique is a dimensionality reduction algorithm that results in a small number of very useful features that explain most of the variation in the data. However, the PCA technique creates new features that are harder to interpret than the features previously generated.

In some embodiments, a feature vector is input into the machine learning model 510. In some embodiments, the values of the various features of the feature vector are normalized, so that, for example, each value is between 0 and 1. In some embodiments, the machine learning model 510 is trained using previously known shadowed domains and benign domain names. In some embodiments, the trained machine learning model 510 outputs a probability of how likely a candidate domain is shadowed. The machine learning model 510 can be any machine learning classifier such as XGboost, a neural network, or a Random Forest. After being trained, the trained machine learning model 510 is input with the feature vector and outputs a vector that corresponds to class probabilities (e.g., [0.6,0.4] for shadowed and not shadowed respectively).

In some embodiments, the class thresholds module 520 receives the vector that corresponds to class probabilities and outputs a final classification: shadowed or not shadowed.

A threshold (e.g., 0.5) is used to provide the desired false positive and false negative tradeoff. Typically, the threshold is set to make only a few false positives. Afterwards, the final classification can be output.

In some embodiments, the machine learning model 510 corresponds to a random forest classifier including a limited number of trees where each tree has a limited number of features and a limited depth. By limiting the depth of trees and the number of features, the constraints can avoid overfitting and increase the ability to generalize the machine learning model 510. Based on the use case, machine learning models with various performance and complexity tradeoffs can be used. Some machine learning models can achieve 99.99 accuracy, 99.92 Precision and 99.87 recall using as few as 64 features and allowing each of 200 trees in the random forest to use no more than eight features and to have a maximum depth of four. A simpler machine learning model—using only 32 features where each tree can only use at most four features and have a depth of two—can also achieve 99.78 accuracy with 99.87 precision and 92.58 recall. Other machine learning model settings can be set where the constraints provide different tradeoffs to satisfy other use cases.

Figure 5B:
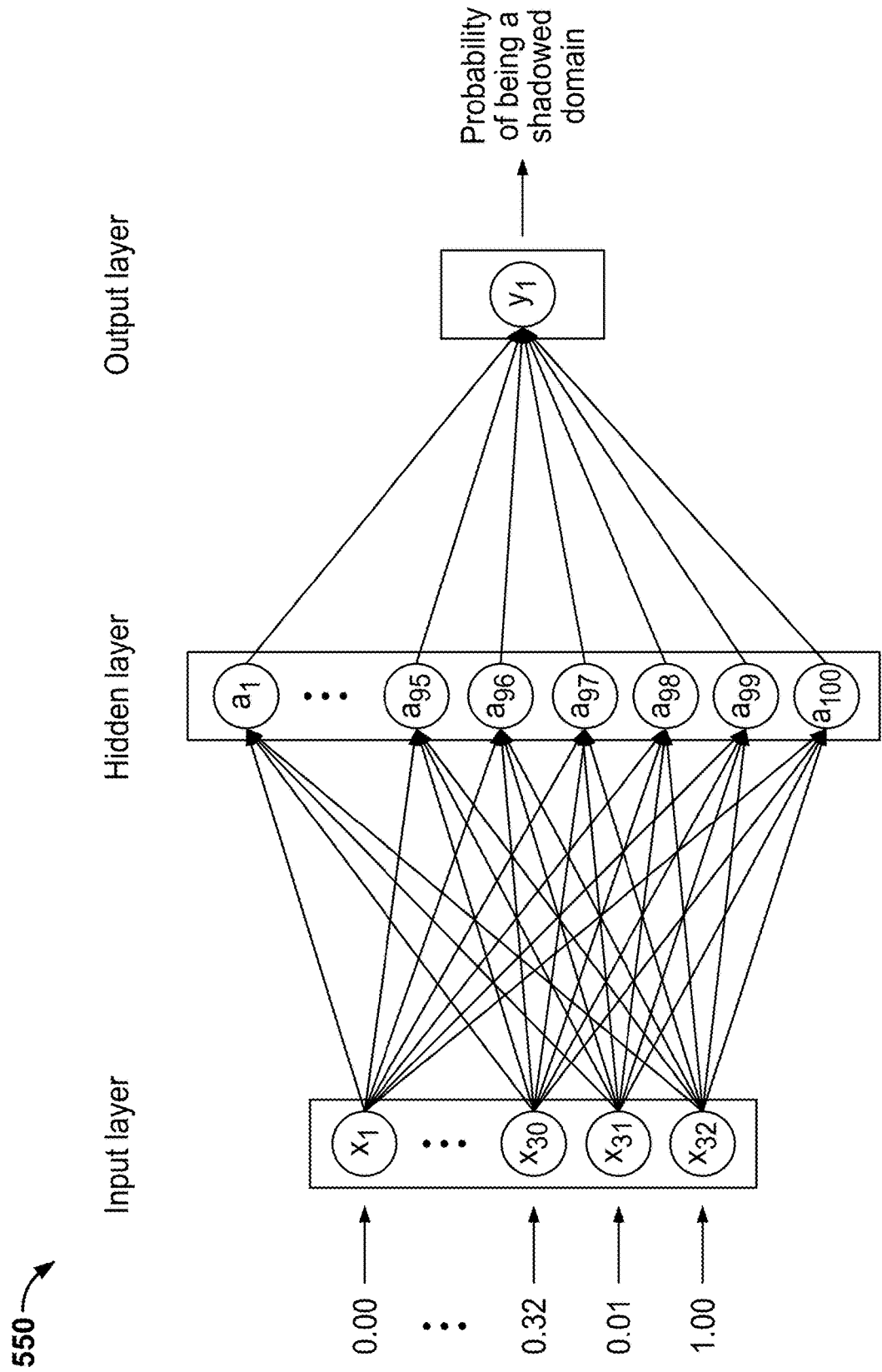
FIG. 5B is an example of a neural network.

FIG. 5B is an example of a neural network. In some embodiments, the neural network 550 can correspond with the machine learning model 510 of FIG. 5A. Vector x (e.g., [0, . . . 0.32, 0.01, 1.00] representing a feature vector) can be an input layer for the neural network 550. In some embodiments, values of each element of the feature vector are normalized, so that the value is between 0 and 1. The input layer is fed into the hidden layer. The output of the hidden layer is computed as $a=\sigma(W \cdot x+b)$. W can be a weight matrix of the hidden layer where each row represents a neuron and each value in a row can represent an importance of an input value for the neuron. As an example, if the hidden layer has 100 neurons and the input layer includes 32 numeric inputs, then the weight matrix is 100×32 matrix. The function σ can be any nonlinear function, such as, for example, sigmoid, tanh, and ReLu functions. The nonlinear functions allow the neural network 550 to learn nonlinear functions between the input and output. The output layer can be similar to the hidden layer but the inputs of the output layer are the outputs of the hidden layer. If there are two classes and a hundred neurons in the hidden layer then the weight matrix of the output layer is to be a 1×100 matrix. The output corresponds with a probability that a domain is a shadowed domain.

The neural network 550 is one example, and other neural networks can be used to detect shadowed domains. The other neural networks can include more layers than in neural network 550 and can have different layers including recurrent neural network layers, convolutional neural network layers, Long Short-Term Memory (LSTM) layers, gated recurrent layers, transformer layers, dropout layers, etc. The other neural networks can use various embeddings, regularization, multi-representation, different activation functions, different sizes for each layer, etc.

Figure 6A:
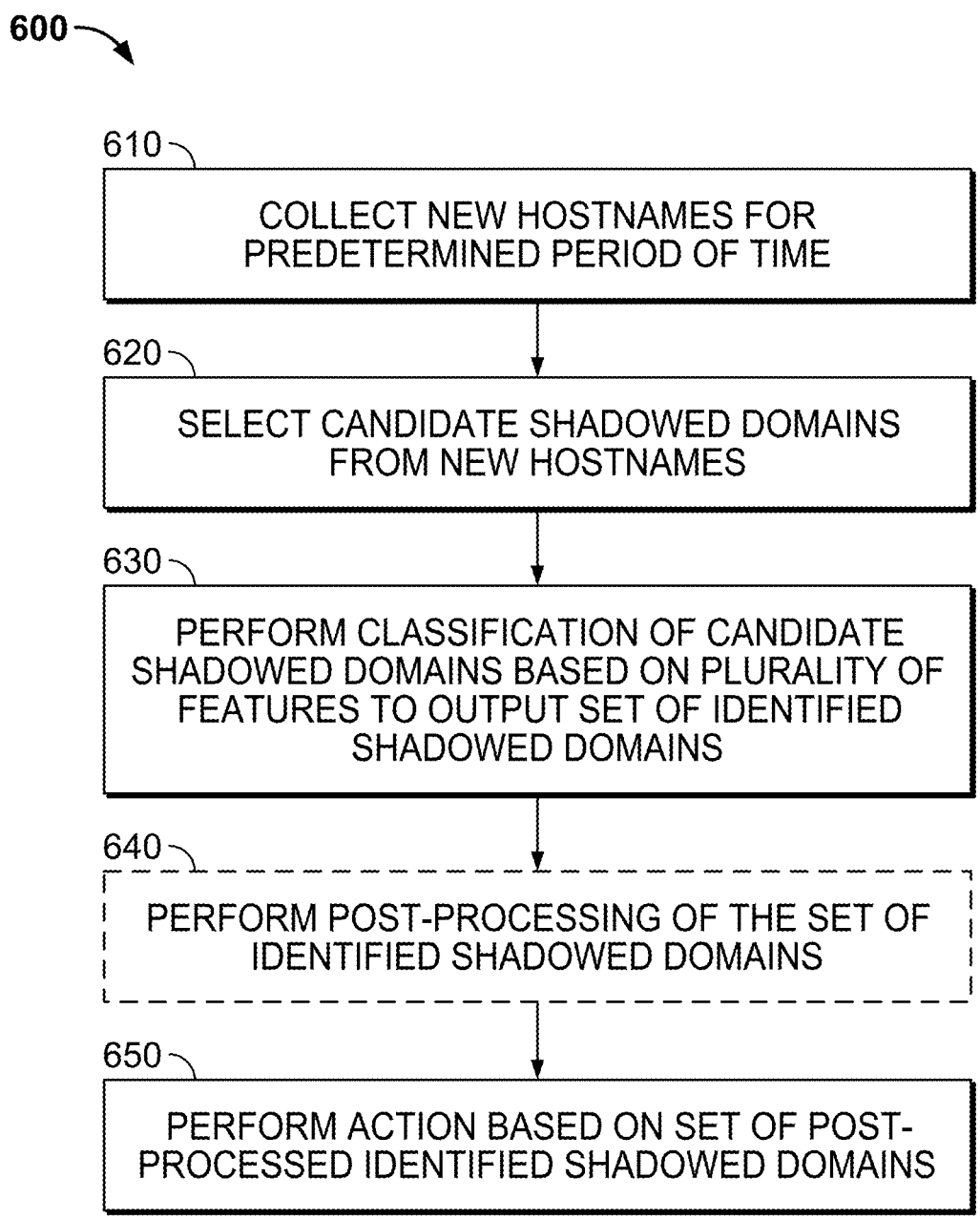
FIG. 6A is a flow diagram illustrating an embodiment of a process for detecting shadowed domains.

FIG. 6A is a flow diagram illustrating an embodiment of a process for detecting shadowed domains. In some embodiments, the process 600 is implemented using the detection pipeline 170 of FIG. 1 and comprises:

In 610, the detection pipeline collects new hostnames for a predetermined period of time.

In 620, the detection pipeline selects candidate shadowed domains from the new hostnames.

In 630, the detection pipeline performs classification of the candidate shadowed domains based on a plurality of features relating to the candidate shadowed domains to output a set of identified shadowed domains.

In 640, optionally, the detection pipeline performs post-processing on the set of identified shadowed domains.

In 650, the detection pipeline performs an action based on the set of identified shadowed domains.

Some of the benefits of process 600 include less computational resources used to determine whether a new hostname is a shadowed domain thus costs are decreased, calculations are performed faster, and less false positives occur as a result.

Figure 6B:
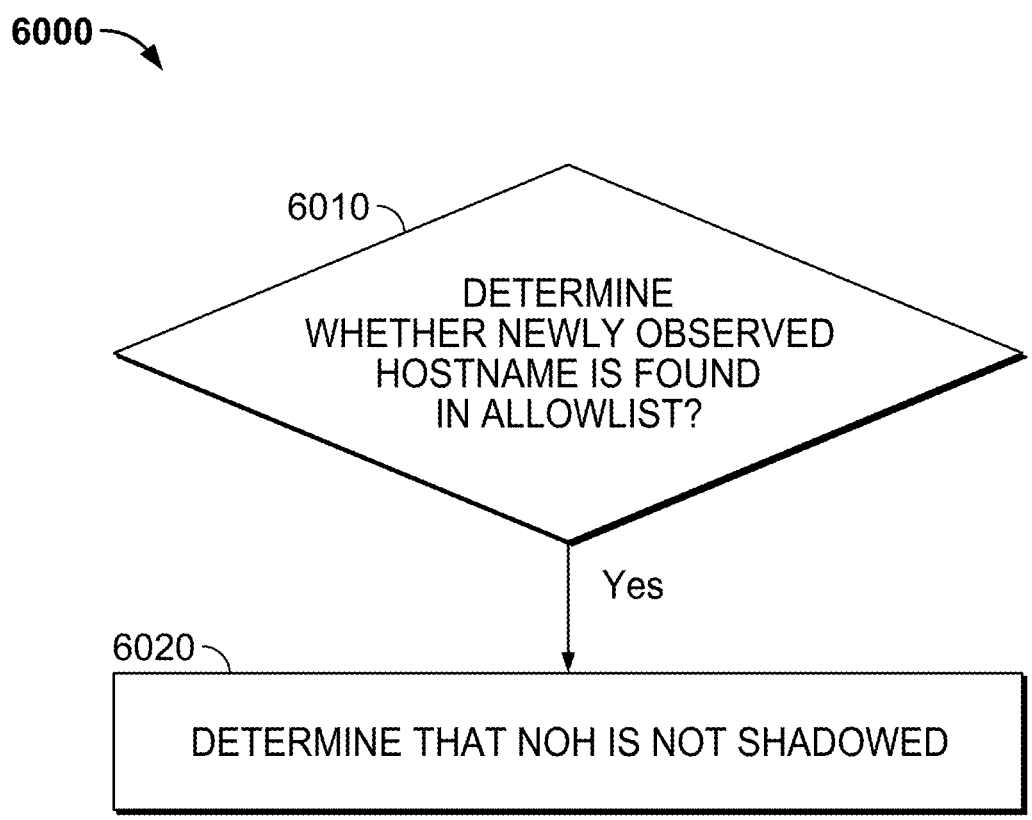
FIG. 6B is a flow diagram illustrating an embodiment of a process for collecting new hostnames for a predetermined period of time.

FIG. 6B is a flow diagram illustrating an embodiment of a process for collecting new hostnames for a predetermined period of time. In some embodiments, the process 6000 is an implementation of operation 610 of FIG. 6A and comprises:

In 6010, the detection pipeline determines whether a newly observed hostname (NOH) from a new hostnames dataset is found in an allowlist.

In 6020, in the event that the NOH is found in the allowlist, the detection pipeline determines that the NOH is not shadowed.

Figure 7:
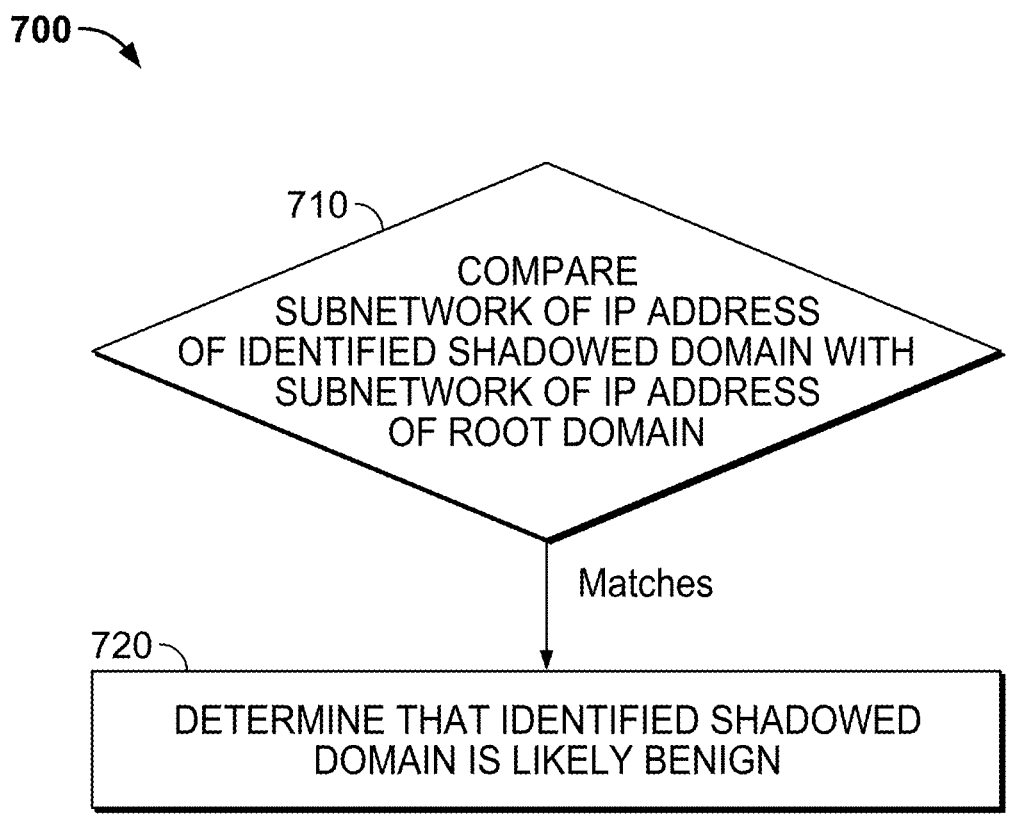
FIG. 7 is a flow diagram illustrating an embodiment of a process for performing post-processing on a set of identified shadowed domains.

FIG. 7 is a flow diagram illustrating an embodiment of a process for performing post-processing on a set of identified shadowed domains. In some embodiments, the process 700 is an implementation of operation 640 of FIG. 6A and comprises:

In 710, the detection pipeline compares a subnetwork of an IP address of the identified shadowed domain with a subnetwork of an IP address of a root domain associated with an identified shadowed domain. In some embodiments, the detection pipeline compares a subnetwork of an IP address of the identified shadowed domain with a subnetwork of an IP address of a root domain associated with an identified shadowed domain using an active DNS data sources and a passive DNS data source.

In 720, in response to a determination that the subnetwork of an IP address of the identified shadowed domain matches the subnetwork of an IP address of the root domain associated with the identified shadowed domain, the detection pipeline determines that the identified shadowed domain is likely benign.

Figure 8:
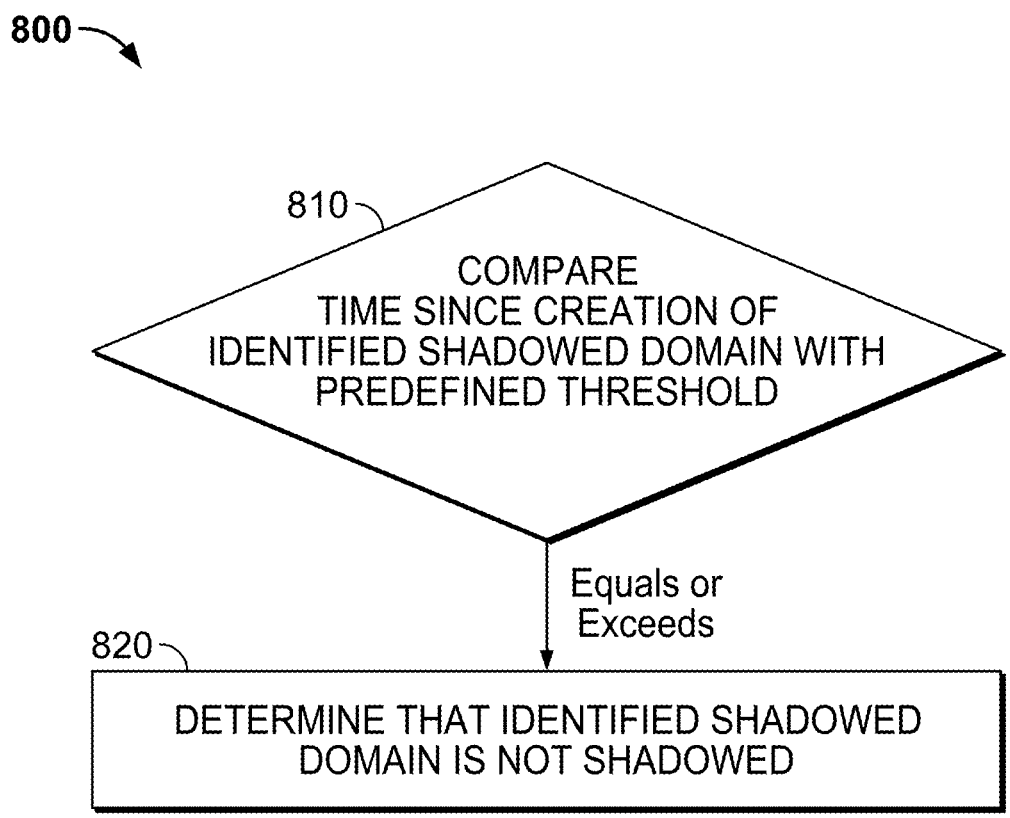
FIG. 8 is a flow diagram illustrating another embodiment of a process for performing post-processing on a set of identified shadowed domains.

FIG. 8 is a flow diagram illustrating another embodiment of a process for performing post-processing on a set of identified shadowed domains. In some embodiments, the process 800 is an implementation of operation 640 of FIG. 6A and comprises:

In 810, the detection pipeline compares a time since creation of an identified shadowed domain with a predefined threshold.

In 820, in response to a determination that the time since creation of the identified shadowed domain is equal to or exceeds the predefined threshold, the detection pipeline determines that the identified shadowed domain is not shadowed.

Figure 9:
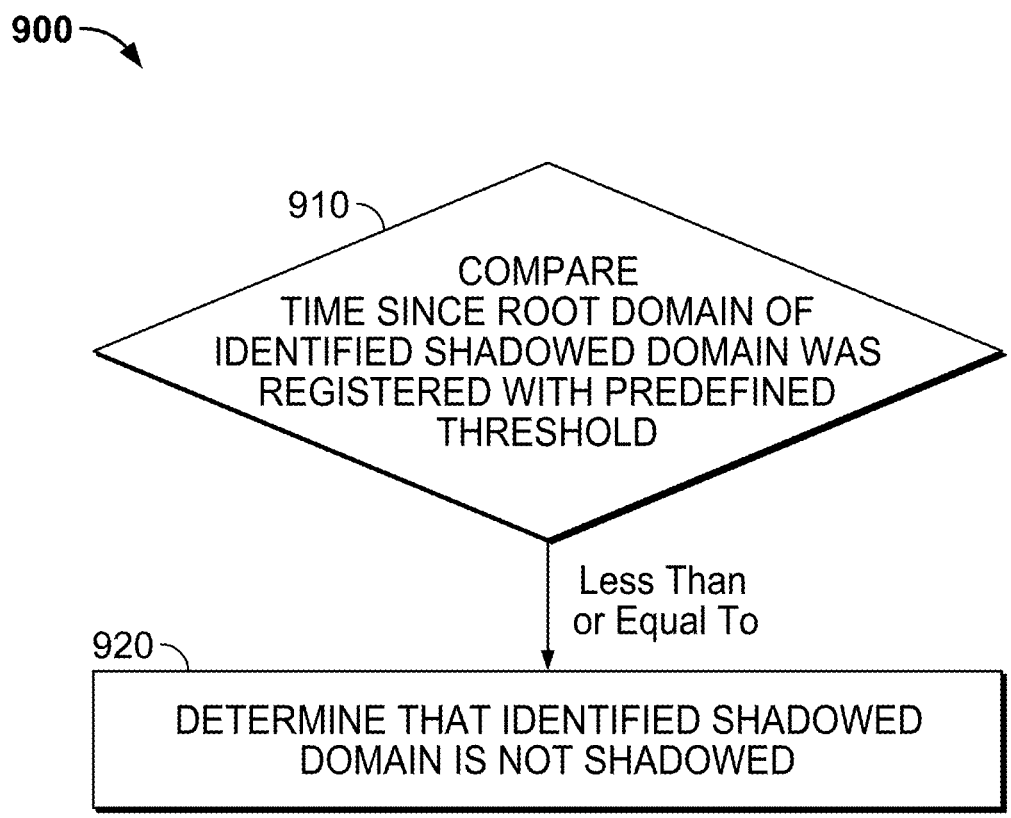
FIG. 9 is a flow diagram illustrating yet another embodiment of a process for performing post-processing on a set of identified shadowed domains.

FIG. 9 is a flow diagram illustrating yet another embodiment of a process for performing post-processing on a set of identified shadowed domains. In some embodiments, the process 900 is an implementation of operation 640 of FIG. 6A and comprises:

In 910, the detection pipeline compares a time since the root domain of an identified shadowed domain was registered with a predefined threshold.

In 920, in response to a determination that the time since the root domain of the identified shadowed domain was registered is less than or equal to the predefined threshold, the detection pipeline determines that the identified shadowed domain is not shadowed.

In some embodiments, operation 640 of FIG. 6A includes one or more of process 700 of FIG. 7, process 800 of FIG. 8, and/or process 900 of FIG. 9.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a processor configured to:
  collect new hostnames for a predetermined period of time;
  select candidate shadowed domains from the new hostnames;
  perform classification of the candidate shadowed domains based on a plurality of features relating to the candidate shadowed domains to output a set of identified shadowed domains;
  perform post-processing on the set of identified shadowed domains, comprising to:
   compare a subnetwork of an IP address of an identified shadowed domain with a subnetwork of an IP address of a root domain associated with the identified shadowed domain, wherein the subnetwork corresponds to the first 24 bits of the IP address of the identified shadowed domain; and
   in response to a determination that the subnetwork of an IP address of the identified shadowed domain matches the subnetwork of an IP address of the root domain associated with the identified shadowed domain, determine that the identified shadowed domain is likely benign; and
  perform an action based on the set of identified shadowed domains, comprising to: add the set of identified shadowed domains to a blacklist of a network security device for blocking access to shadowed domains; and
 a memory coupled to the processor and configured to provide the processor with instructions.

2. The system of claim 1, wherein the collecting of the new hostnames for the predetermined period of time comprises to:
 determine whether a newly observed hostname (NOH) from a new hostnames dataset is found in an allowlist; and
 in the event that the NOH is found in the allowlist, determine that the NOH is not shadowed.

3. The system of claim 1, wherein the performing of the classification of the candidate shadowed domains comprises to:
 extract the plurality of features relating to the candidate shadowed domains; and
 perform the classification of the candidate shadowed domains using a model or a set of rules.

4. The system of claim 3, wherein the model is a machine learning model.

5. The system of claim 3, wherein the model is a machine learning model, the machine learning model being a neural network.

6. The system of claim 1, wherein the processor is further configured to:
perform post-processing on the set of identified shadowed domains, comprising to:
compare a time since creation of an identified shadowed domain with a predefined threshold; and
in response to a determination that the time since creation of the identified shadowed domain is equal to or exceeds the predefined threshold, determine that the identified shadowed domain is not shadowed.

7. The system of claim 1, wherein the processor is further configured to:
perform post-processing on the set of identified shadowed domains, comprising to:
compare a time since the root domain of an identified shadowed domain was registered with a predefined threshold; and
in response to a determination that the time since the root domain of the identified shadowed domain was registered is less than or equal to the predefined threshold, determine that the identified shadowed domain is not shadowed.

8. A system, comprising:
a processor configured to:
collect new hostnames for a predetermined period of time;
select candidate shadowed domains from the new hostnames;
perform classification of the candidate shadowed domains based on a plurality of features relating to the candidate shadowed domains to output a set of identified shadowed domains;
perform post-processing on the set of identified shadowed domains, comprising to:
compare a subnetwork of an IP address of an identified shadowed domain with a subnetwork of an IP address of a root domain associated with the identified shadowed domain, wherein the comparing of the subnetwork of an IP address of the identified shadowed domain with the subnetwork of an IP address of the root domain associated with the identified shadowed domain comprises to:
compare the subnetwork of an IP address of the identified shadowed domain with the subnetwork of an IP address of the root domain associated with the identified shadowed domain based on an active DNS dataset and a passive DNS dataset; and
in response to a determination that the subnetwork of an IP address of the identified shadowed domain matches the subnetwork of an IP address of the root domain associated with the identified shadowed domain, determine that the identified shadowed domain is likely benign; and
perform an action based on the set of identified shadowed domains, comprising to: add the set of identified shadowed domains to a blacklist of a network security device for blocking access to shadowed domains; and
a memory coupled to the processor and configured to provide the processor with instructions.

9. A method, comprising:
collecting, using a processor, new hostnames for a predetermined period of time;
selecting, using the processor, candidate shadowed domains from the new hostnames;
performing, using the processor, classification of the candidate shadowed domains based on a plurality of features relating to the candidate shadowed domains to output a set of identified shadowed domains;
performing post-processing on the set of identified shadowed domains, comprising:
comparing a subnetwork of an IP address of the identified shadowed domain with a subnetwork of an IP address of a root domain associated with the identified shadowed domain, wherein the subnetwork corresponds to the first 24 bits of the IP address of the identified shadowed domain; and
in response to a determination that the subnetwork of an IP address of an identified shadowed domain matches the subnetwork of an IP address of the root domain associated with the identified shadowed domain, determining that the identified shadowed domain is benign; and
performing, using the processor, an action based on the set of identified shadowed domains, comprising: adding the set of identified shadowed domains to a blacklist of a network security device for blocking access to shadowed domains.

10. The method of claim 9, wherein the performing of the classification of the candidate shadowed domains comprises:
extracting the plurality of features relating to the candidate shadowed domains; and
performing the classification of the candidate shadowed domains using a model or a set of rules.

11. The method of claim 9, wherein the model is a machine learning model.

12. The method of claim 9, wherein the model is a machine learning model, the machine learning model being a neural network.

13. The method of claim 9, further comprising:
before the performing of the action, performing post-processing on the set of identified shadowed domains, comprising:
comparing a time since creation of the identified shadowed domain with a predefined threshold; and
in response to a determination that the time since creation of an identified shadowed domain is equal to or exceeds the predefined threshold, determining that the identified shadowed domain is not shadowed.

14. A computer program product embodied in a non-transitory computer readable medium and comprising computer instructions for:
collecting new hostnames for a predetermined period of time;
selecting candidate shadowed domains from the new hostnames;
performing classification of the candidate shadowed domains based on a plurality of features relating to the candidate shadowed domains to output a set of identified shadowed domains;
performing post-processing on the set of identified shadowed domains, comprising:
comparing a subnetwork of an IP address of the identified shadowed domain with a subnetwork of an IP address of a root domain associated with the identified shadowed domain, wherein the subnetwork corresponds to the first 24 bits of the IP address of the identified shadowed domain; and in response to a determination that the subnetwork of an IP address of an identified shadowed domain matches the subnetwork of an IP address of the root domain associated with the identified shadowed domain, determining that the identified shadowed domain is benign; and performing an action based on the set of identified shadowed domains, comprising: adding the set of identified shadowed domains to a blacklist of a network security device for blocking access to shadowed domains.

15. A method, comprising:

collecting, using a processor, new hostnames for a predetermined period of time;

selecting, using the processor, candidate shadowed domains from the new hostnames;

performing, using the processor, classification of the candidate shadowed domains based on a plurality of features relating to the candidate shadowed domains to output a set of identified shadowed domains;

performing post-processing on the set of identified shadowed domains, comprising:

comparing a subnetwork of an IP address of the identified shadowed domain with a subnetwork of an IP address of a root domain associated with the identified shadowed domain, wherein the comparing of the subnetwork of an IP address of the identified shadowed domain with the subnetwork of an IP address of the root domain associated with the identified shadowed domain comprises:

comparing the subnetwork of an IP address of the identified shadowed domain with the subnetwork of an IP address of the root domain associated with the identified shadowed domain based on an active DNS dataset and a passive DNS dataset; and in response to a determination that the subnetwork of an IP address of an identified shadowed domain matches the subnetwork of an IP address of the root domain associated with the identified shadowed domain, determining that the identified shadowed domain is benign; and performing, using the processor, an action based on the set of identified shadowed domains, comprising: adding the set of identified shadowed domains to a blacklist of a network security device for blocking access to shadowed domains.

16. A computer program product embodied in a non-transitory computer readable medium and comprising computer instructions for:

collecting new hostnames for a predetermined period of time;

selecting candidate shadowed domains from the new hostnames;

performing classification of the candidate shadowed domains based on a plurality of features relating to the candidate shadowed domains to output a set of identified shadowed domains;

performing post-processing on the set of identified shadowed domains, comprising:

comparing a subnetwork of an IP address of the identified shadowed domain with a subnetwork of an IP address of a root domain associated with the identified shadowed domain, wherein the subnetwork corresponds to the first 24 bits of the IP address of the identified shadowed domain, wherein the comparing of the subnetwork of an IP address of the identified shadowed domain with the subnetwork of an IP address of the root domain associated with the identified shadowed domain comprises:

comparing the subnetwork of an IP address of the identified shadowed domain with the subnetwork of an IP address of the root domain associated with the identified shadowed domain based on an active DNS dataset and a passive DNS dataset; and in response to a determination that the subnetwork of an IP address of an identified shadowed domain matches the subnetwork of an IP address of the root domain associated with the identified shadowed domain, determining that the identified shadowed domain is benign; and performing an action based on the set of identified shadowed domains, comprising:

adding the set of identified shadowed domains to a blacklist of a network security device for blocking access to shadowed domains.

* * * * *